United States Patent
Dhar et al.

(10) Patent No.: US 11,922,483 B2
(45) Date of Patent: Mar. 5, 2024

(54) SOCIAL MEDIA BUTTONS WITH PAYMENT CAPABILITY

(71) Applicant: PAYPAL, INC., San Jose, CA (US)

(72) Inventors: Shilpa Dhar, San Jose, CA (US); Teddy Vincent Toms, San Jose, CA (US)

(73) Assignee: PAYPAL, INC., San Jose, CA (US)

( * ) Notice: Subject to any disclaimer, the term of this patent is extended or adjusted under 35 U.S.C. 154(b) by 516 days.

(21) Appl. No.: 17/139,422

(22) Filed: Dec. 31, 2020

(65) Prior Publication Data

US 2021/0125261 A1    Apr. 29, 2021

Related U.S. Application Data

(63) Continuation of application No. 16/890,958, filed on Jun. 2, 2020, now abandoned, which is a continuation of application No. 15/974,631, filed on May 8, 2018, now Pat. No. 10,672,059, which is a continuation of (Continued)

(51) Int. Cl.
*G06Q 30/00*     (2023.01)
*G06Q 20/12*     (2012.01)
*G06Q 30/0601*   (2023.01)
*G06Q 50/00*     (2012.01)

(52) U.S. Cl.
CPC ......... *G06Q 30/0633* (2013.01); *G06Q 20/12* (2013.01); *G06Q 50/01* (2013.01)

(58) Field of Classification Search
CPC .... G06Q 30/00; G06Q 30/06; G06Q 30/0601; G06Q 30/0623; G06Q 30/0625; G06Q 30/0633; G06Q 30/0641
See application file for complete search history.

(56) References Cited

U.S. PATENT DOCUMENTS

| | | | | |
|---|---|---|---|---|
| 6,731,788 B1 * | 5/2004 | Agnihotri | ............... | G11B 27/28 |
| | | | | 382/165 |
| 7,014,107 B2 * | 3/2006 | Singer | .................... | G06Q 20/32 |
| | | | | 705/64 |

(Continued)

OTHER PUBLICATIONS

Anderson, Matt, et al. "Turning "Like" to "Buy" social media emerges as a commerce channel." Booz & Company Inc 2.1 (2011): 102-128. (Year: 2011).*

(Continued)

*Primary Examiner* — Christopher B Seibert
(74) *Attorney, Agent, or Firm* — Haynes and Boone, LLP

(57) ABSTRACT

Methods and systems for facilitating the purchase of an item on a social networking website are described. Merchants can embed payments in buttons displayed on social networking websites to enable payments at the point of discovery, such as on Pinterest® or Facebook®. As the items associated with the buttons are shared further, the embedded payment capability follows the shared items. For example, a Pinterest® pin has the payment capability embedded within it so as the pin gets re-pinned in the Pinterest® platform, shared on blogs, shared on platforms like Facebook®, or surfaces on Google® Search, the payment capability is also available on those platforms. In some instances, open standards such as oEmbed or Open Graph are used to create the buttons with the payment capability and make creation of the buttons simpler for merchants.

20 Claims, 9 Drawing Sheets

Related U.S. Application Data application No. 14/316,721, filed on Jun. 26, 2014, now Pat. No. 9,965,796.

(56) References Cited

U.S. PATENT DOCUMENTS

| | | | | |
|---|---|---|---|---|
| 8,255,323 B1* | 8/2012 | Casey | ............... | G06Q 20/42 705/42 |
| 8,458,053 B1* | 6/2013 | Buron | ............... | H04N 21/4316 705/26.1 |
| 8,660,912 B1* | 2/2014 | Dandekar | ............... | G06Q 30/02 705/26.1 |
| 8,706,566 B1 | 4/2014 | Mirchandani et al. | | |
| 8,977,554 B1* | 3/2015 | Hertschuh | ............... | G06Q 30/0623 704/270 |
| 9,224,167 B2* | 12/2015 | Lampert | ............... | G06Q 30/0633 |
| 2005/0212752 A1* | 9/2005 | Marvit | ............... | G06F 3/0346 345/156 |
| 2006/0224973 A1* | 10/2006 | Albrecht | ............... | G06F 9/451 715/760 |
| 2007/0050406 A1* | 3/2007 | Byers | ............... | G06F 16/48 |
| 2007/0106570 A1* | 5/2007 | Hartman | ............... | G06Q 30/0605 705/26.8 |
| 2007/0112647 A1* | 5/2007 | Borders | ............... | G06Q 30/016 705/26.81 |
| 2007/0294240 A1* | 12/2007 | Steele | ............... | G06F 16/338 707/999.005 |
| 2008/0244721 A1* | 10/2008 | Barrus | ............... | G06F 21/6254 726/9 |
| 2009/0037284 A1* | 2/2009 | Lewis | ............... | G06Q 20/202 705/16 |
| 2009/0037291 A1* | 2/2009 | Dawson | ............... | G06Q 30/0603 705/27.2 |
| 2009/0063353 A1 | 3/2009 | Viidu et al. | | |
| 2009/0132347 A1* | 5/2009 | Anderson | ............... | G06Q 30/02 705/30 |
| 2009/0157479 A1* | 6/2009 | Caldwell | ............... | G06Q 30/0631 705/26.7 |
| 2009/0187825 A1* | 7/2009 | Sandquist | ............... | G06F 40/169 715/719 |
| 2010/0114654 A1* | 5/2010 | Lukose | ............... | G06Q 30/0256 705/14.54 |
| 2010/0131347 A1* | 5/2010 | Sartipi | ............... | G06Q 20/40 705/17 |
| 2010/0250382 A1 | 9/2010 | Babaria | | |
| 2011/0282785 A1* | 11/2011 | Chin | ............... | G06Q 20/108 705/42 |
| 2012/0136756 A1* | 5/2012 | Jitkoff | ............... | G06F 16/9577 715/224 |
| 2012/0166267 A1 | 6/2012 | Beatty et al. | | |
| 2012/0179552 A1* | 7/2012 | Tishkevich | ............... | G06Q 30/0269 705/26.7 |
| 2012/0191569 A1* | 7/2012 | Shah | ............... | G06Q 30/0613 705/26.41 |
| 2012/0221437 A1* | 8/2012 | Yoo | ............... | G06Q 20/209 705/26.41 |
| 2012/0233020 A1* | 9/2012 | Eberstadt | ............... | G06Q 30/06 705/26.1 |
| 2012/0290402 A1 | 11/2012 | Rothman | | |
| 2012/0310738 A1* | 12/2012 | Mesaros | ............... | G06Q 50/01 705/14.57 |
| 2013/0006733 A1* | 1/2013 | Fisher | ............... | G06Q 50/01 705/14.12 |
| 2013/0013427 A1* | 1/2013 | Gonsalves | ............... | G06Q 30/02 705/27.1 |
| 2013/0066987 A1* | 3/2013 | Levinson | ............... | G06Q 10/10 709/206 |
| 2013/0066988 A1* | 3/2013 | Levinson | ............... | G06Q 10/107 709/206 |
| 2013/0076788 A1* | 3/2013 | Ben Zvi | ............... | G06F 16/5854 345/633 |
| 2013/0290149 A1* | 10/2013 | Rashwan | ............... | G06Q 30/0641 705/27.1 |
| 2013/0307765 A1* | 11/2013 | Li | ............... | G06F 3/017 345/156 |
| 2013/0325980 A1* | 12/2013 | Ohayon | ............... | H04L 51/066 709/206 |
| 2013/0339229 A1* | 12/2013 | Li | ............... | H04L 12/1453 705/40 |
| 2014/0019367 A1* | 1/2014 | Khan | ............... | G06Q 20/425 705/16 |
| 2014/0025521 A1* | 1/2014 | Alsina | ............... | G06Q 30/0601 705/26.1 |
| 2014/0052587 A1 | 2/2014 | Bereck et al. | | |
| 2014/0058850 A1 | 2/2014 | Reckert et al. | | |
| 2014/0095583 A1* | 4/2014 | Houle | ............... | G06F 40/197 709/203 |
| 2014/0136334 A1* | 5/2014 | Lagassey | ............... | G06Q 30/0277 705/14.69 |
| 2014/0136990 A1* | 5/2014 | Gonnen | ............... | H04L 51/18 715/752 |
| 2014/0172608 A1 | 6/2014 | Sit et al. | | |
| 2014/0189514 A1* | 7/2014 | Hilliard | ............... | G06Q 30/06 715/719 |
| 2014/0279266 A1* | 9/2014 | Lampert | ............... | G06Q 30/0629 705/26.64 |
| 2014/0285435 A1* | 9/2014 | Bezos | ............... | G06F 1/1626 345/156 |
| 2014/0297362 A1* | 10/2014 | Kumar | ............... | G06Q 30/0253 705/7.29 |
| 2014/0297537 A1* | 10/2014 | Kassemi | ............... | G06Q 20/401 705/67 |
| 2015/0052061 A1* | 2/2015 | Anderson | ............... | G06Q 20/409 705/44 |
| 2015/0058238 A1* | 2/2015 | Milley | ............... | H04W 4/21 705/319 |
| 2015/0088655 A1* | 3/2015 | Taylor | ............... | G06Q 30/0264 705/14.61 |
| 2015/0088686 A1* | 3/2015 | Glassberg | ............... | G06Q 50/01 705/26.8 |
| 2015/0142640 A1* | 5/2015 | Kneen | ............... | G06Q 20/22 705/39 |
| 2015/0149168 A1* | 5/2015 | Stent | ............... | G10L 15/22 704/235 |
| 2015/0317698 A1* | 11/2015 | Kalyvas | ............... | G06Q 30/0214 705/14.66 |

OTHER PUBLICATIONS

Belvedere, Valeria, Alberto Grando, and Paola Bielli. "A quantitative investigation of the role of information and communication technologies in the implementation of a product-service system." International Journal of Production Research 51.2 (2013): 410-426. (Year: 2013).*

Dallas et al., "AT&T Taps Bazaarvoice to Get Closer to Customers on Facebook", Business Wire, Dec. 28, 2010, 4 pages.

International Appl. No. PCT/US2015/023386, PCT International Search Report and Written Opinion dated Jul. 7, 2015, 9 pages.

Joiner et al., "Consumer-centric marketing," DM News, Oct. 2012, 34.10, 4 pages.

* cited by examiner

▽ Step 1: Choose a button type and enter your payment details

Choose a button type ~ 206
[ Buy Now  ⇕ ]
Note: Go to My saved buttons to create a new button similar to an existing one.

ⓘ Which button should I choose?

☑ Add the "Pinit" button ~ 208

Item name ~ 202
[                              ]

Item ID (optional) What's this? ~ 204
[       ]

| Website | Email |

```
src="https://www.serviceproviderobjects.com/en_US/i/btn/btn_buynowCC_LG.gif"
border="0" name="submit" alt="Service Provider-The safer, easier way to pay
online!">
<img alt="" border="0"
src="https://www.serviceproviderobjects.com/en_US/i/scr/pixel.gif" width="1"
height="1"> ~ 210
</form>
```

Buyer's View ~ 212

( Buy Now ) ~ 214

☐☐☐☐☐☐

[ Pinit ] ~ 216

[ Select Code ]  Go back to edit this button

FIG. 2

SOCIAL MEDIA BUTTONS WITH PAYMENT CAPABILITY

CROSS REFERENCED TO RELATED APPLICATIONS

This application is a continuation of U.S. patent application Ser. No. 16/890,958, filed Jun. 2, 2020, which is a continuation of U.S. patent application Ser. No. 15/974,631, filed on May 8, 2018, (now issued as U.S. Pat. No. 10,672,059 on Jun. 2, 2020), which is a continuation of U.S. patent application Ser. No. 14/316,721, issued as U.S. Pat. No. 9,965,796, on May 8, 2018, contents of which are incorporated by reference in their entirety.

BACKGROUND

Field of the Invention

The present invention generally relates to facilitating the purchase of items on a social networking website.

Related Art

Social networks enable connections between members (including people, businesses, and other entities) and have become extremely popular as Internet websites in recent years. In particular, social network websites allow registered members to openly communicate and efficiently share information with other registered members. Such information sharing includes indicators of members (users) own tastes in various areas, such as music, literature, entertainment, sports, and the like.

Consumers are discovering more and more products on social platforms such as Pinterest®, Twitter®, Facebook®, and Houzz®. Most often, consumers discover products they like via social sharing and from wish lists on idea boards or pin boards. Industry statistics show that there is a high degree of correlation between discovering a product, sharing the product, and actually purchasing the product. Frequently, however, a consumer is inconvenienced by having to leave the social networking site and go through a process with the merchant for making the purchase before returning back to the original site. Because of this inconvenience, a consumer may simply forgo any purchase while on the social networking site, resulting in potential lost sales for merchants.

Thus, a need exists for systems and methods that allow a consumer to buy items directly from a social networking site.

BRIEF DESCRIPTION OF THE FIGURES

FIG. 2 is a screenshot of a service provider page that illustrates various options a merchant has in creating a button according to an embodiment of the present disclosure;

Figure 1:
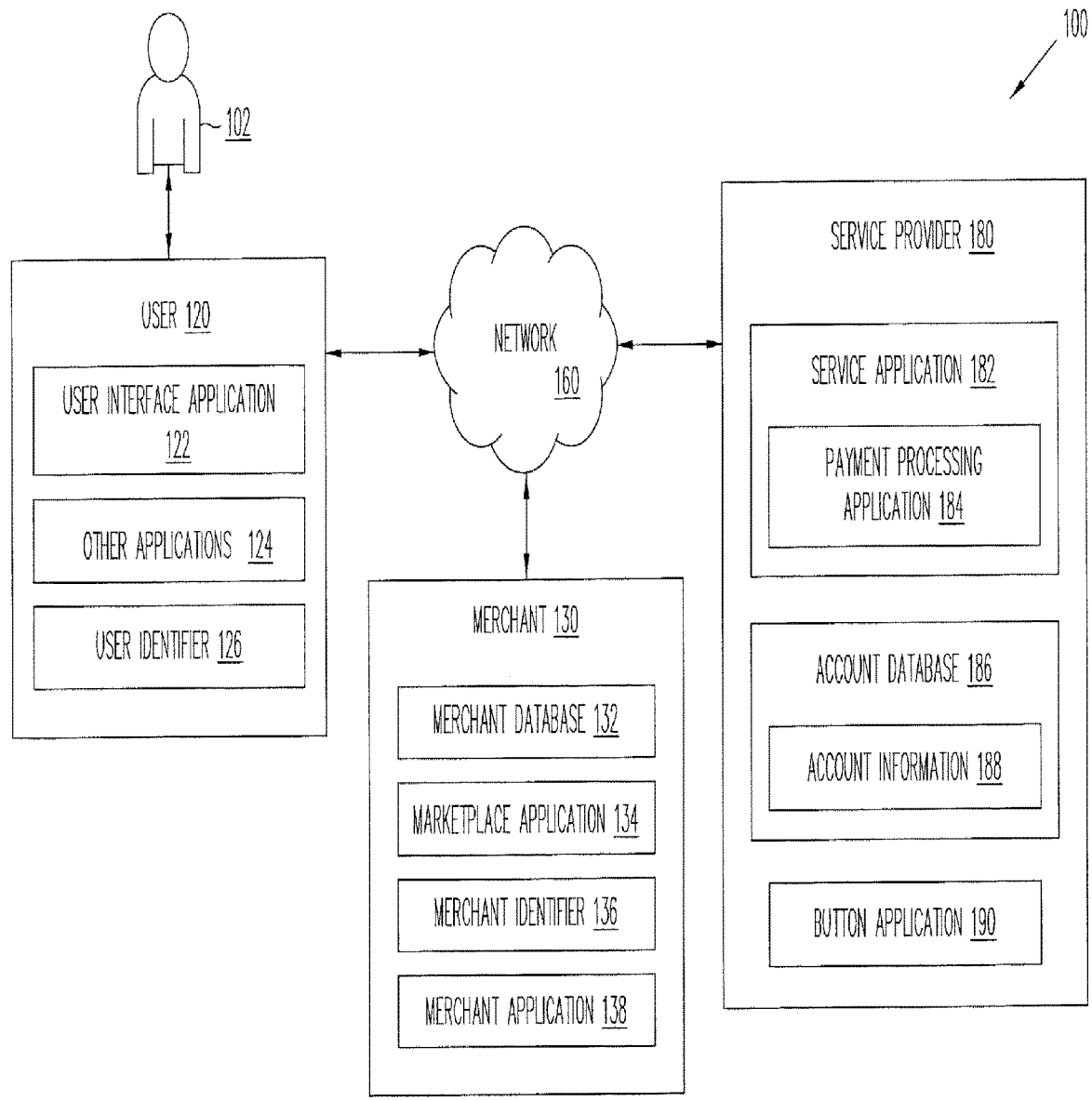
FIG. 1 is a block diagram illustrating a system for facilitating purchase of an item on a social networking website according to an embodiment of the present disclosure.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure describes systems and methods of permitting a user/consumer on a social network website to access commercial information and purchase products without navigating from the social network website itself. Payments are embedded within social media buttons, e.g., forms of sharing such as liking, tweeting, etc., to ultimately enable payments on a social networking website. As the items associated with the social media buttons are shared further, so does the embedded payment capability. For example, a Pinterest® pin has the payment capability embedded within it so as the pin gets re-pinned in the Pinterest® platform, shared on blogs, shared on platforms like Facebook®, or surfaces on Google® Search, the payment capability is also available on those platforms.

The payment capability involves leveraging existing service provider payment products, such as PayPal's® Button Factory or other feature enabling buttons to be created and placed onto sites, to provide the payment capabilities with minor changes to social networking partner codes, like adding an additional name-value parameter to the existing social media button embed functionality. For example, the Pinterest® "Pin it" button codes can include an option to embed a PayPal® payment link so that the "Pin it" button code generated by Button Factory includes the checkout uniform resource locator (URL).

Thus, the user is capable of reviewing and purchasing products directly from the social network address. That is, the user purchases a good or service while registered with a social network website without leaving or linking to a different website. The user selects a button on the social network website to see, for example, a pop-up window on the website that may be pre-filled with certain information, such as information about the user, merchant, and transaction. As a result, the user can make a payment quickly and easily with minimal time spent away from the social network website.

FIG. 1 shows one embodiment of a block diagram of a network-based system 100 adapted to facilitate the purchase of items on a social networking website with a user device 120 over a network 160. As shown, system 100 may comprise or implement a plurality of servers and/or software components that operate to perform various methodologies in accordance with the described embodiments. Exemplary servers may include, for example, stand-alone and enterprise-class servers operating a server OS such as a MICROSOFT® OS, a UNIX® OS, a LINUX® OS, or other suitable server-based OS. It can be appreciated that the servers illustrated in FIG. 1 may be deployed in other ways and that the operations performed and/or the services provided by such servers may be combined or separated for a given implementation and may be performed by a greater number or fewer number of servers. One or more servers may be operated and/or maintained by the same or different entities.

As shown in FIG. 1, the system 100 includes a user device 120 (e.g., a smartphone), one or more merchant servers or devices 130 (e.g., network server devices), and at least one service provider server or device 180 (e.g., network server device) in communication over the network 160. The network 160, in one embodiment, may be implemented as a single network or a combination of multiple networks. For example, in various embodiments, the network 160 may include the Internet and/or one or more intranets, landline networks, wireless networks, and/or other appropriate types of communication networks. In another example, the network 160 may comprise a wireless telecommunications network (e.g., cellular phone network) adapted to communicate with other communication networks, such as the Internet.

The user device 120, in one embodiment, may be utilized by the user 102 to interact with the merchant server or device 130 and/or the service provider server 180 over the network 160. For example, the user 102 may conduct financial transactions (e.g., account transfers) with the service provider server 180 via the user device 120. The user device 120, in various embodiments, may be implemented using any appropriate combination of hardware and/or software configured for wired and/or wireless communication over the network 160. In various implementations, the user device 120 includes a wireless telephone (e.g., cellular or mobile phone), a tablet, a personal computer, a notebook computer, a wearable computing device, and/or various other generally known types of wired and/or wireless computing devices.

The user device 120, in one embodiment, includes a user interface application 122, which may be utilized by the user 102 to conduct transactions (e.g., shopping, purchasing, bidding, etc.) with the merchant server or device 130 and/or service provider server 180 over the network 160. In one aspect, purchase expenses may be directly and/or automatically debited from an account related to the user 102 via the user interface application 122.

In one implementation, the user interface application 122 comprises a software program, such as a graphical user interface (GUI), executable by a processor that is configured to interface and communicate with the service provider server 180 via the network 160. In another implementation, the user interface application 122 comprises a browser module that provides a network interface to browse information available over the network 160. For example, the user interface application 122 may be implemented, in part, as a web browser to view information available over the network 160.

In an example, the user 102 is able to access social networking websites via the network 160 and merchant websites via the one or more merchant servers 130 to view and select items for purchase, and the user 102 is able to purchase items from the one or more merchant servers 130 via the service provider server 180. Accordingly, in one or more embodiments, the user 102 may conduct transactions (e.g., purchase and provide payment for one or more items) from the one or more merchant servers 130 via the service provider server 180.

The user device 120, in various embodiments, may include other applications 124 as may be desired in one or more embodiments of the present disclosure to provide additional features available to user 102. In one example, such other applications 124 may include security applications for implementing client-side security features, programmatic client applications for interfacing with appropriate application programming interfaces (APIs) over the network 160, and/or various other types of generally known programs and/or software applications. In still other examples, the other applications 124 may interface with the user interface application 122 for improved efficiency and convenience.

In various implementations, a user profile may be created using data and information obtained from cell phone activity over the network 160. Cell phone activity transactions may be used by the service provider server 180 to create at least one user profile for the user 102 based on activity from the user device 120 (e.g., cell phone). The user profile may be updated with each financial and/or information transaction (e.g., payment transaction, purchase transaction, etc.) achieved through use of the user device 120. In various aspects, this may include the type of transaction and/or the location information from the user device 120. As such, the profile may be used for recognizing patterns of potential fraud, setting transaction limits on the user, etc.

The user device 120, in one embodiment, may include at least one user identifier 126, which may be implemented, for example, as operating system registry entries, cookies associated with the user interface application 122, identifiers associated with hardware of the user device 120, or various other appropriate identifiers. The user identifier 126 may include one or more attributes related to the user 102, such as personal information related to the user 102 (e.g., one or more user names, passwords, photograph images, biometric IDs, addresses, phone numbers, social security number, etc.) and banking information and/or funding sources (e.g., one or more banking institutions, credit card issuers, user account numbers, security data and information, etc.). In various implementations, the user identifier 126 may be passed with a user login request to the service provider server 180 via the network 160, and the user identifier 126 may be used by the service provider server 180 to associate the user 102 with a particular user account maintained by the service provider server 180.

The one or more merchant servers 130, in various embodiments, may be maintained by one or more business entities (or in some cases, by a partner of a business entity that processes transactions on behalf of business entities). Examples of businesses entities include merchant sites, resource information sites, utility sites, real estate management sites, social networking sites, etc., which offer various items for purchase and payment. In some embodiments, business entities may need registration of the user identity information as part of offering items to the user 102 over the network 160. As such, each of the one or more merchant servers 130 may include a merchant database 132 for identifying available items, which may be made available to the user device 120 for viewing and purchase by the user 102. In one or more embodiments, user 102 may complete a transaction such as purchasing the items via service provider server 180.

Each of the merchant servers 130, in one embodiment, may include a marketplace application 134, which may be configured to provide information over the network 160 to the user interface application 122 of the user device 120. For example, user 102 may interact with the marketplace application 134 through the user interface application 122 over the network 160 to search and view various items available for purchase in the merchant database 132.

Each of the merchant servers 130, in one embodiment, may include at least one merchant identifier 136, which may be included as part of the one or more items made available for purchase so that, e.g., particular items are associated with particular merchants. In one implementation, the merchant identifier 136 may include one or more attributes and/or parameters related to the merchant, such as business and banking information. The merchant identifier 136 may include attributes related to the merchant server or device 130, such as identification information (e.g., a serial number, a location address, GPS coordinates, a network identification number, etc.). In various embodiments, user 102 may conduct transactions (e.g., searching, selection, monitoring, purchasing, and/or providing payment for items) with each merchant server 130 via the service provider server 180 over the network 160.

In various embodiments, the merchant server 130 includes a merchant application 138 that permits a merchant to initiate the creation and generation of buttons to include in an online store or website for customers to arrange for purchase and payment of items offered for sale. The merchant application 138 may be provided by the service provider, be created to operate in coordination with a service provider application, or may exist on the service provider server 180 as part of the button application 190 and accessible to the merchant over the network 160.

The merchant application 138 may be operable in conjunction with the button application 190 for creating, generating, and displaying item listings and buttons associated with the various items to be offered for sale. The merchant may input a list of items to be offered for sale and information related to the item to be included in the item listing, for example, descriptions of such items, prices for such items, inventory information for such items, and/or any other information related to the item. The merchant application 138 may communicate the input information to the service provider server 180, and the button application 190 may generate the item listings and store the item listings in a database.

A merchant website may also communicate (for example, using merchant server 130) with the service provider through service provider server 180 over network 160. For example, the merchant website may communicate with the service provider in the course of various services offered by the service provider to a merchant website, such as payment intermediary between customers of the merchant website and the merchant website itself. For example, the merchant website may use an application programming interface (API) that allows it to offer sale of goods in which customers are allowed to make payment through the service provider, while user 102 may have an account with the service provider that allows user 102 to use the service provider for making payments to merchants that allow use of authentication, authorization, and payment services of the service provider as a payment intermediary. The merchant website may also have an account with the service provider.

The service provider server 180, in one embodiment, may be maintained by a transaction processing entity or an online service provider, which may provide processing for financial transactions and/or information transactions between the user 102 and one or more of the merchant servers 130. As such, the service provider server 180 includes a service application 182, which may be adapted to interact with the user device 120 over the network 160 to facilitate the searching, selection, purchase, and/or payment of items by the user 102 from the one or more merchant servers 130. In one example, the service provider server 180 may be provided by PayPal®, Inc., eBay® of San Jose, California, USA, and/or one or more financial institutions or a respective intermediary that may provide multiple point of sale devices at various locations to facilitate transaction routings between merchants and, for example, financial institutions.

The service application 182, in one embodiment, utilizes a payment processing application 184 to process purchases and/or payments for financial transactions between the user 102 and each of the merchant servers 130. In one implementation, the payment processing application 184 assists with resolving financial transactions through validation, delivery, and settlement. As such, the service application 182 in conjunction with the payment processing module 184 settles indebtedness between the user 102 and each of the merchant servers 130, wherein accounts may be directly and/or automatically debited and/or credited of monetary funds in a manner as accepted by the banking industry.

The service provider server 180, in one embodiment, may be configured to maintain one or more user accounts and merchant accounts in an account database 186, each of which may include account information 188 associated with one or more individual users (e.g., user 102) and merchants. For example, account information 188 may include private financial information of user 102 and merchants (e.g., one or more merchants associated with merchant servers 130), such as one or more account numbers, passwords, credit card information, banking information, or other types of financial information, which may be used to facilitate financial transactions between user 102, and one or more merchants associated with the merchant servers 130. The account information 188 may also include personal information, such as one or more contact information (e.g., a phone number, address, or an email) and other account IDs of the user 102 that are maintained by third parties (e.g., user names or account numbers). In various aspects, the methods and systems described herein may be modified to accommodate users and/or merchants that may or may not be associated with at least one existing user account and/or merchant account, respectively.

In one implementation, the user 102 may have identity attributes stored with the service provider server 180, and user 102 may have credentials to authenticate or verify identity with the service provider server 180. User attributes may include personal information, banking information and/or funding sources. In various aspects, the user attributes may be passed to the service provider server 180 as part of a login, search, selection, purchase, and/or payment request, and the user attributes may be utilized by the service provider server 180 to associate user 102 with one or more particular user accounts maintained by the service provider server 180.

In various embodiments, the service provider server 180 includes a button application 190. The button application 190 allows a merchant to input and forward information to the service provider. The input information may include a description of an item for sale, price of the item, taxes, shipping costs, or any other information required by or optionally permitted by the service provider. The input information may be communicated to the service provider server 180 over the network 160. The information input by a merchant may be received by and processed by the button application 190. The information may be collected and stored in account database 186. For example, the information may be stored in a merchant database, containing all information related to a particular, corresponding merchant, including item listings.

An item listing may include various information related to an item including, for example, price, description, inventory information, color, size, tax rate, options, or any other information related to the item. The button application 190 may assign a unique identifier for each item listing stored in the database. In an example embodiment, the unique identifier may include a merchant ID and an item ID, which together uniquely identifies an item. The unique identifiers may be generated by the button application 190 and may be provided to the merchant.

In some embodiments, the button application 190 generates buttons to be associated with items offered or to be offered for sale on a merchant's online store. The buttons may comprise a file, code, or group of electronically stored information that will display a link or button to be selected to initiate a purchase and may also provide for the display of any pertinent item information from the item listing that is desired to be displayed, for example, item name, prices, options, or other information.

In various embodiments, a merchant may copy a button or button code provided by the service provider and associated with a particular item identified by a unique identifier into code representative of a network-based store, for example, a website or webpage. When a user (e.g., user 102) navigates to the network-based store, the button causes a graphic or textual link or button to be displayed. In some embodiments, the button is displayed along with information from the item listing. Although the item listing information is stored at the database, the button code may cause the button application 190 to push the information to the user device 120 to be displayed on a display or screen of the user device 120.

In certain embodiments, a merchant may place a button onto a network-based store in order to offer an item for sale and provide a convenient method of payment for the item. A merchant may place the button onto a network-based store, for example, by copying code provided by the service provider and pasting the code for the network-based store, for example pasting into an HTML, code representative of a website or a webpage. In one embodiment, code for the button placed on the network-based store may include the unique identifiers, for example a merchant ID and the item ID.

In various embodiments, the button application 190 creates payment buttons that are rich buttons that incorporate product ratings and reviews in the checkout experience by supporting open formats for product information and inventory like oEmbed or Open Graph. Rich buttons are buttons that include extra information right on the button itself so that a user can see the extra information without further navigation. For example, item ratings and real-time item availability can be displayed along with the button. oEmbed is a format for allowing an embedded representation of a URL on third party sites. The simple API allows a website to display embedded contents (such as photos or videos) when a user posts a link to that resource, without having to parse the resource directly. The Open Graph protocol enables any webpage to become a rich object in a social graph. The button application 190 can re-use the same product metadata provided by the merchant (e.g., item price, availability, etc.) in an open format to automatically generate the payment button. This feature of the button application 190 not only increases the sales channels for the products, but also makes it easier for the merchant to include payment options with information that already exists on their webpage.

In an exemplary embodiment, the button application 190 includes a field to get an open embed URL for a product. The merchant can create payment buttons linked to the open embed product API end-point. The payment button that is created has up-to-date product information at all times, since this information comes from the merchant's API end-point. Advantageously, the merchant does not need to input the product or item information.

In some embodiments, the button application 190 builds an embeddable widget (JavaScript), which can be put on a merchant product page. The widget can be created with basic information, such as a merchant's service provider credentials. When a consumer visits the webpage, the widget scans the page for open format meta tags for information like product name, product price, discount information, product description, etc. When the consumer clicks the payment button, the product information is transmitted to the service provider, and payment can be completed.

FIG. 2 illustrates an exemplary screen shot 200 of various options that button application 190 may provide for a merchant when creating a button. The options may be displayed to the merchant using the merchant application 138. For instance, a merchant may input the item name 202 and/or an item number or ID 204. The item ID 204 may be assigned prior to entry by the merchant, or may be automatically generated by the service provider and displayed on the merchant input form if it is the first time an item has been entered. The item ID 204 may be generated one at a time, as a button is created, or may be done in bulk, if a number of buttons are created at one time. If the item ID 204 was previously generated, the merchant can enter the item ID 204 to track the associated item(s).

In several embodiments, a merchant may select a button type 206 or type of transaction or payment to be supported by a button. Types of transactions to be supported by a button may include, for example, payments for goods, services, subscriptions and recurring billing, donations, gift certificates, or any other type of payment arrangement appropriate for an item offered for sale. Each different type of button may provide a different type of payment structure or services provided by the service provider.

A merchant may elect to create an "add to cart" button or a "buy now" button, depending on whether the merchant wants a customer to make multiple purchases before checking out or not. The merchant may enter a unit price and currency to be used. The merchant may provide different options available to be selected by a customer depending on their preference. For example, various prices may be listed for various size, color, or other options selected by a user. The various prices and options may be accessible through drop-down menus by the user when accessing the network-based store. A merchant may enter shipping rates, tax rates, e-mail address or account information for receipt of payments.

In various embodiments, a merchant may choose from various other options available for the display of the button. For example, a merchant may choose to select a stock look for a button or upload their own graphics for the button. A merchant may select their own drop down menus, name the menus, select drop down menus with or without prices, or other options.

In exemplary embodiments, the merchant also has the option 208 to include a "Pin it" button or other social media button along with the payment button. By selecting the option to add the "Pin it" button, the "Pin it" button code 210 is included along with the payment button, which in this case is a "Buy Now" button, so that the "Pin it" button is displayed along with the current "Buy Now" button. The "Pin it" button code generated by the button application 190 includes the checkout URL.

In certain embodiments, the screen shown to a merchant while creating buttons may generate a display of the buttons 212 as seen by the buyer, including any or all options selected. This may assist a merchant in designing or determining which options to include in a button display. For example, the merchant may choose to include a payment button and a social media button, such as Facebook's® "Like" button, Twitter's® "Tweet" button, Pinterest's® "Pin It" button, or Houzz's® "Save to Ideabook" button. When a user selects a social media button and shares an item associated with the social media button, the payment button follows the social media button so that wherever the item is shared, the payment button is displayed. As the item is shared or posted further on other social media platforms, users can select the payment button to purchase the item.

As seen in FIG. 2, the display includes the "Buy Now" button 214 and the "Pin it" button 216. When a customer selects the "Pin it" button 216 and re-pins the item, the "Buy Now" button 214 follows the pin so that payment capability propagates with re-pins on the Pinterest® platform. The "Pin it" button 216 has embedded payment information that allows the pin to be shared or posted across social networks, and for users to select the pin to purchase the product from the merchant who created the pin.

In an embodiment, the button application 190 does not automatically place the button code on a merchant's network-based store, although the merchant may place the button code on the network-based store by copying and pasting button code provided by the service provider into the store's code, for example a website's HTML code.

Figure 3:
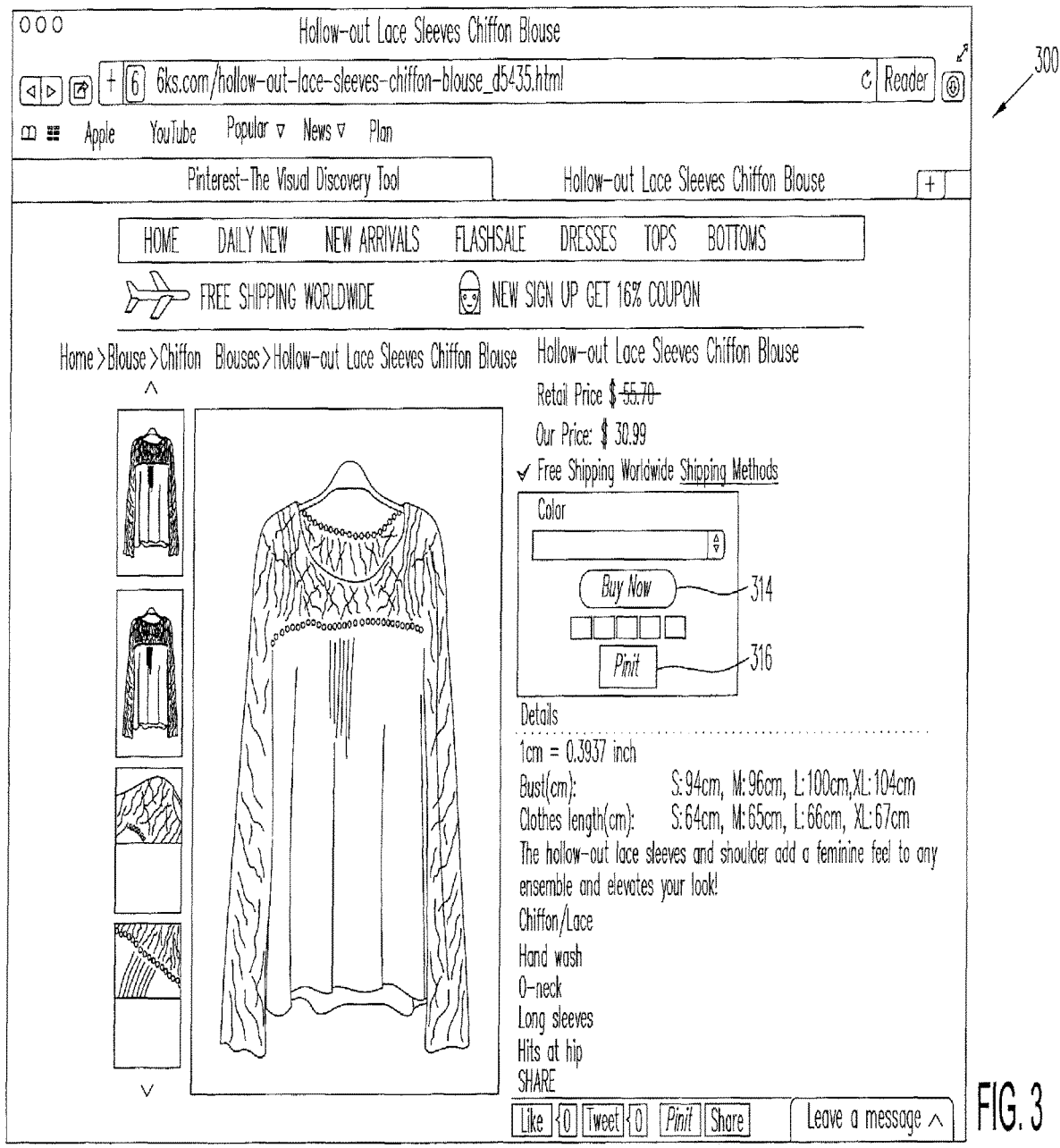
FIG. 3 is a screenshot of a merchant webpage according to an embodiment of the present disclosure.

FIG. 3 illustrates an exemplary screenshot 300 of a merchant webpage with the "Buy Now" button 314 and "Pin it" button 316 together. The buttons 314 and 316 are displayed in connection with a blouse offered by the merchant. When a user selects the social media button (here the "Pin it" button 316), the item content is shared on a social media platform or website, along with the payment button (here the "Buy Now" button 314). The payment button follows the item content wherever it is shared.

Figure 4A:
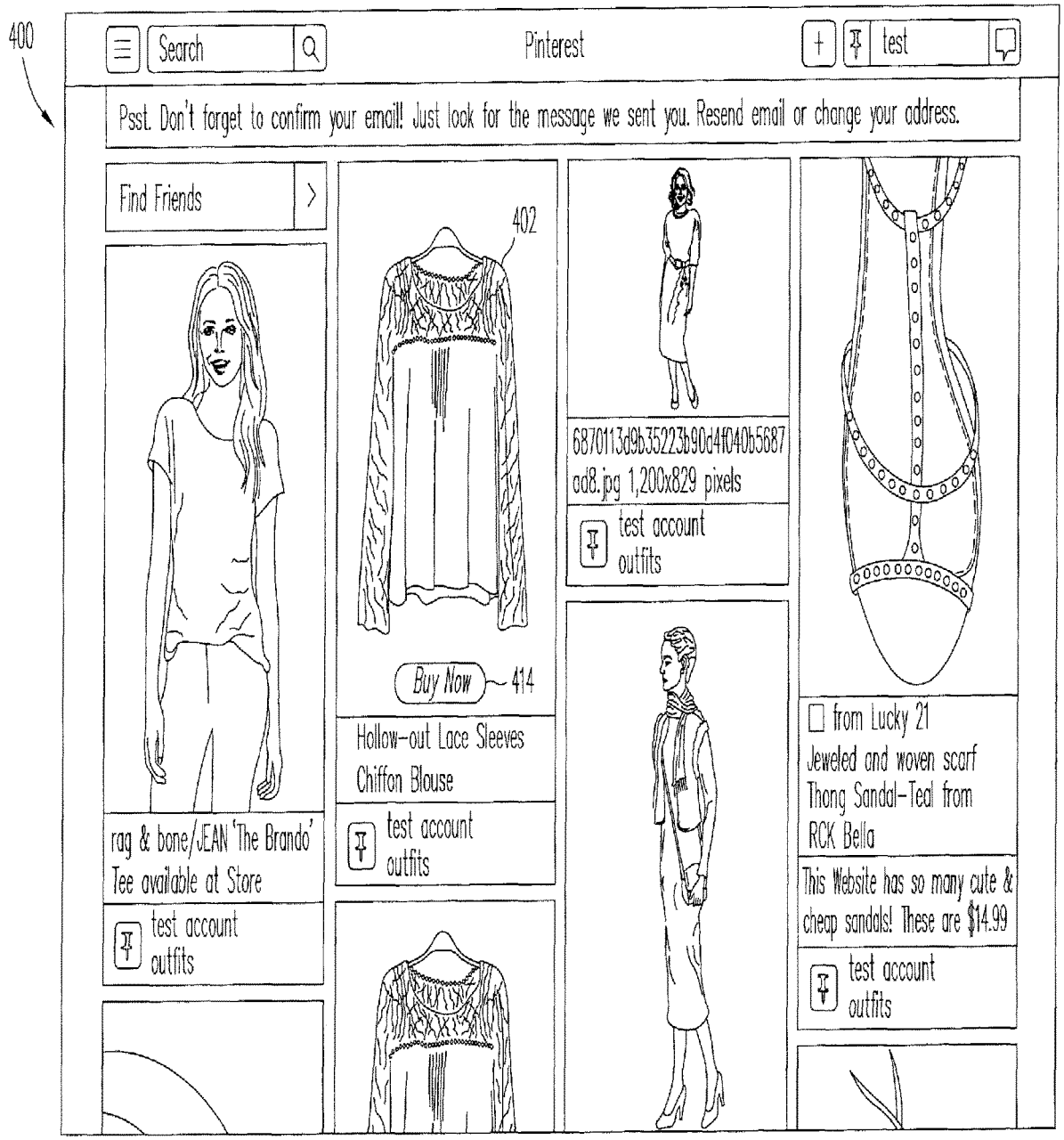
FIGS. 4A-4B, 5, and 6 are screenshots of a social networking page according to an embodiment of the present disclosure.

When a user selects the "Pin it" button 316, the user is redirected to the Pinterest® site. FIG. 4A is an exemplary screenshot 400 of a Pinterest® webpage that shows a pin 402 of the blouse in FIG. 3. The user is taken to the Pinterest® platform, and displayed along with the pin 402 is the "Buy Now" button 414. The "Buy Now" button 414 follows the pin 402 so that the user or whoever follows the user on Pinterest® and wants to buy the blouse can click on the "Buy Now" button 414 instead of clicking on the pin 402, being redirected to the merchant website, and buying the blouse from the merchant website.

Figure 4B:
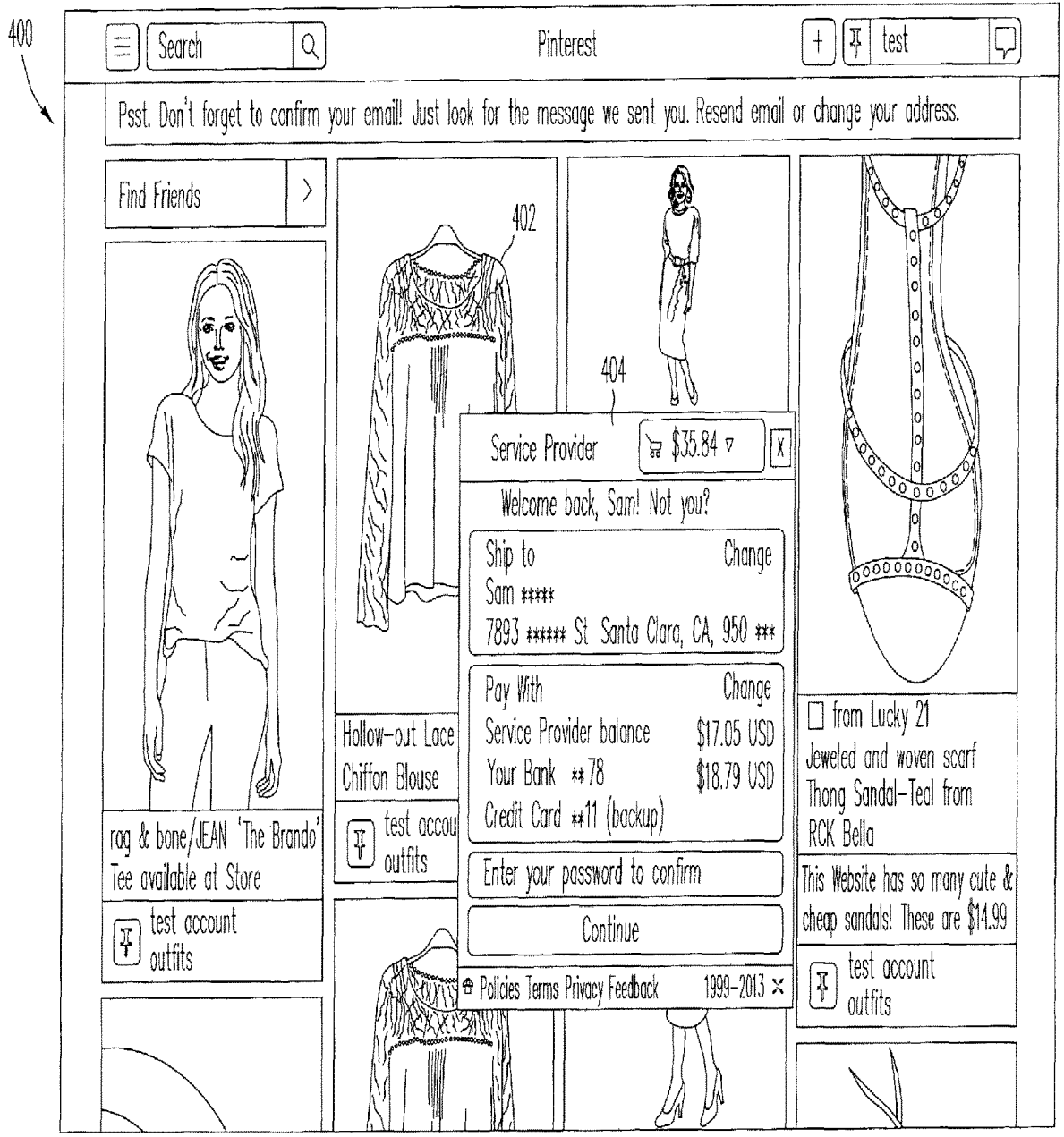

If the user decides to purchase the blouse, he or she can select or click on the "Buy Now" button 414. FIG. 4B illustrates an exemplary screenshot 400 with a service provider pop up overlay 404 displayed with user information pre-filled, such as shipping address and available funding sources. The user can process payment through the pop-up overlay 404 on the Pinterest® webpage. The user, in some embodiments, may need to enter a password or other identifier to access the user's service provider account and confirm payment. In various embodiments, the pop-up overlay 404 allows the user to change preferences and select options for the item (such as size, color, etc.).

Note that if the user does not have an account with the service provider, the user may be taken to a page where the user can sign up for an account. This may include opening a new window for the service provider site, which may request specific information about the user. In one embodiment, the information includes some combination of the user's name, billing address, mailing address, credit card information, bank account information, user name, and password.

Figure 5:
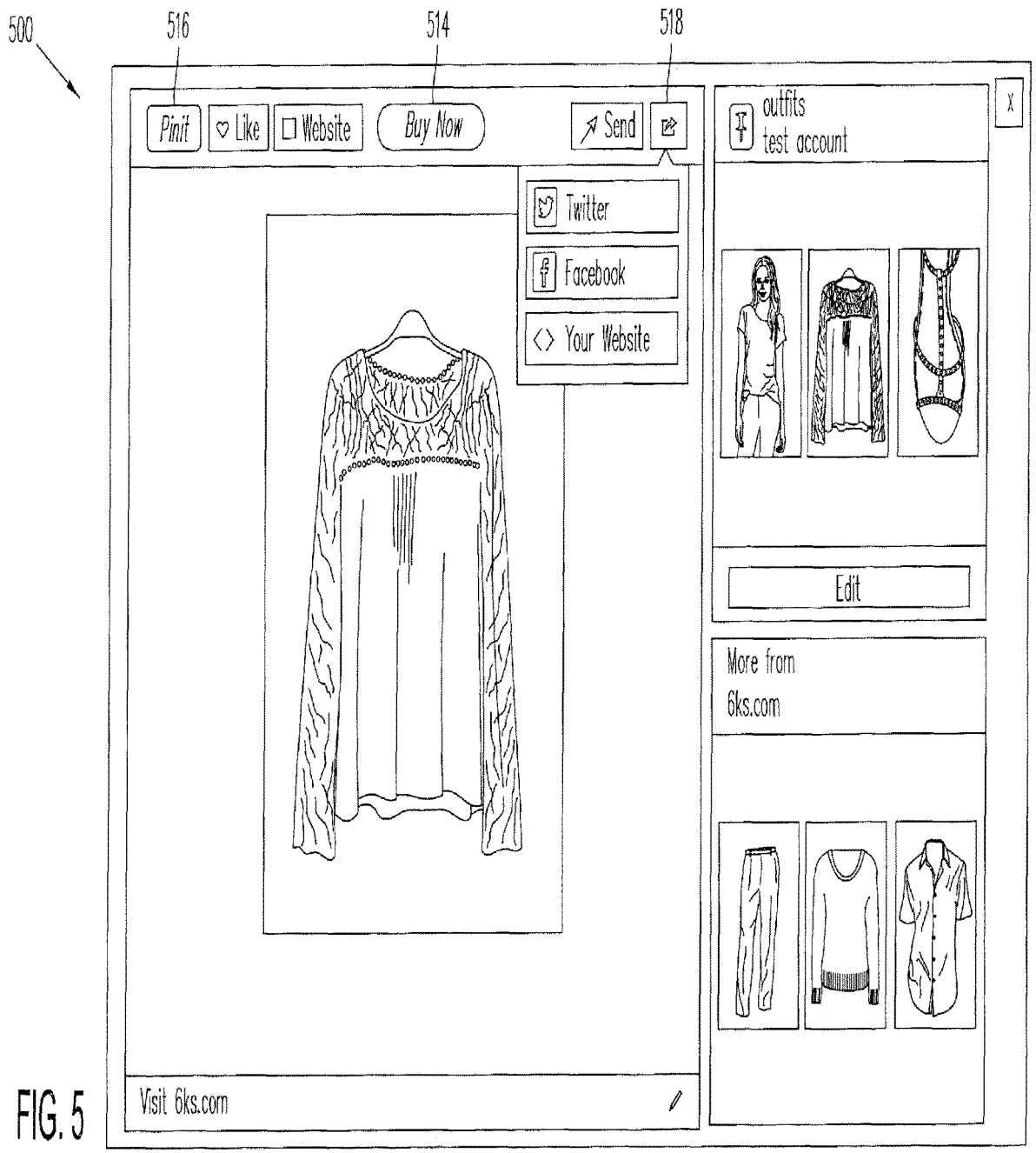

When a user clicks on the pin itself, rather than any button, the user is directed to another Pinterest® webpage. FIG. 5 illustrates an exemplary screenshot 500 of the webpage. The "Buy Now" button 514, as well as the "Pin it" button 516 is displayed to the user. In addition, the user is given the option 518 to share the pin on other websites, such as Twitter®, Facebook®, or the user's own website. By combining the payment information in the social media button and by leveraging existing open formats/standards, a single product listing has the potential of spreading virally and opening new avenues for sales.

Figure 6:
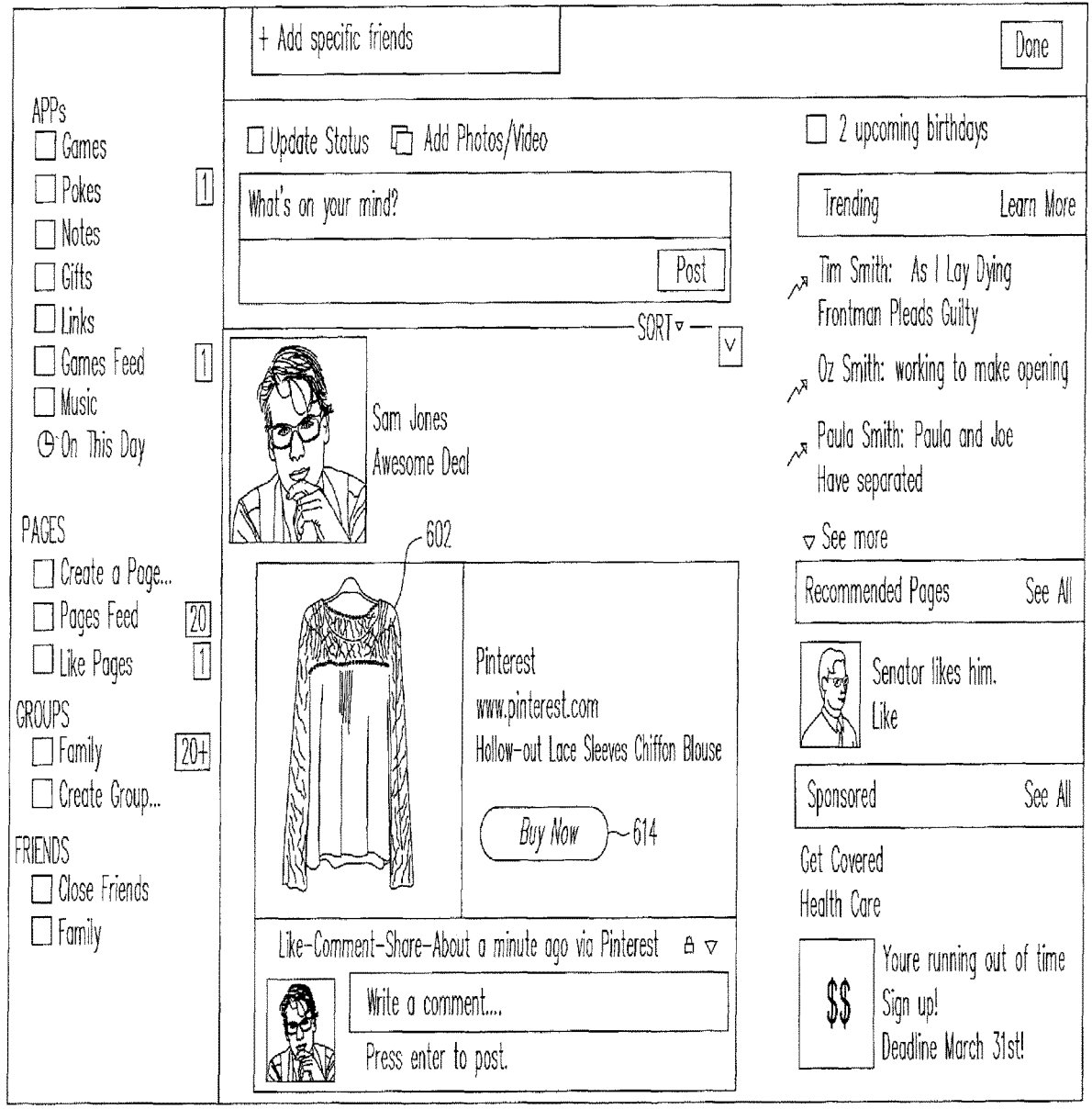

In one embodiment, the user decides to share the pin on Facebook®. FIG. 6 illustrates an exemplary screenshot 600 of a Facebook® page that includes the shared pin 602. As shown, the shared pin 602 includes the "Buy Now" button 614. The "Buy Now" button 614 continues to follow the pin so that a user or a follower/friend of the user can purchase the item associated with the pin directly at the point of discovery, i.e., the social networking website.

Figure 7:
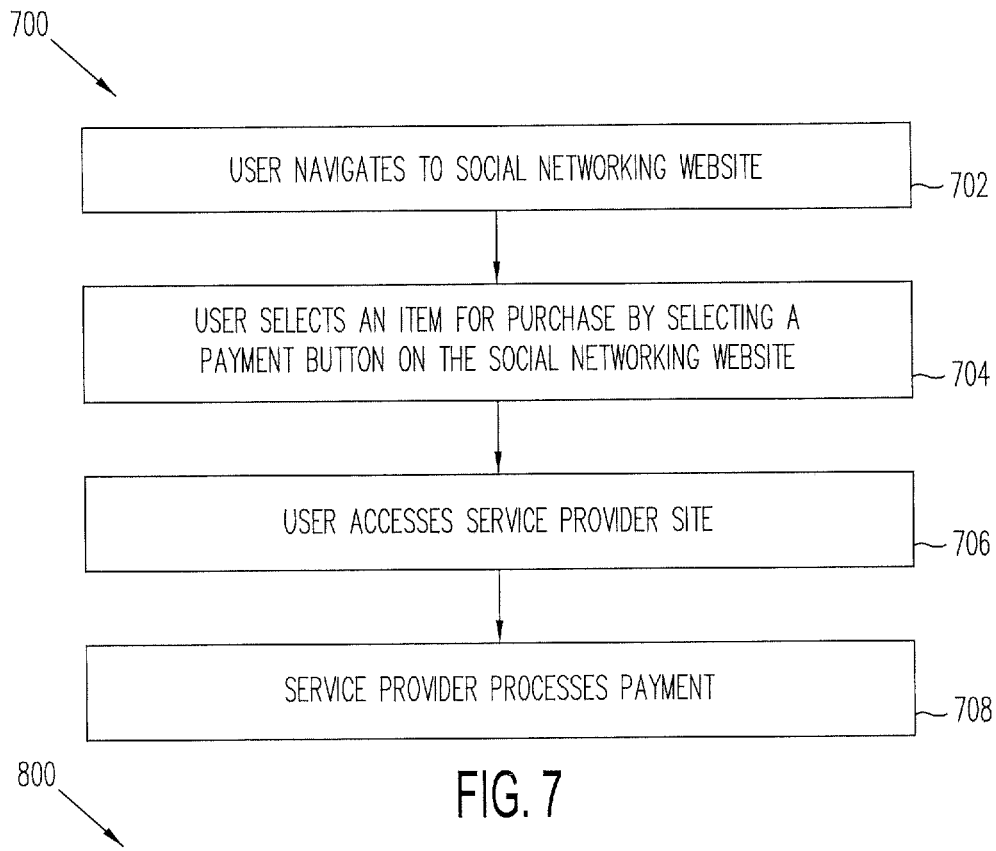
FIG. 7 is a flowchart showing a method for facilitating purchase of an item on a social networking website showing the steps of a user according to an embodiment of the present disclosure.

Referring now to FIG. 7, a flowchart of a method 700 for facilitating purchase of an item on a social networking website illustrated according to an embodiment of the present disclosure. At step 702, the user 102 navigates to a social networking website with user device 120. A particular webpage, website, or other location where an item is shared may appear on a display associated with the user device 120. User device 120 may be a computer, cell phone, smartphone, laptop, wearable computing device, or any other network communication device with hardware and software that enables the user to use the device 120 to access and navigate a social networking website. The display may be a separate screen, built-in screen, cell phone or smartphone display, or any other device arranged to display images and/or information accessed from the social networking website to display information and/or a link or button for executing a purchase transaction for an item.

At step 704, the user 102 selects an item for purchase by selecting a payment button on the social networking website, such as by pressing a keyboard or keypad key, or mouse or other screen navigation device to generate a signal or message indicative of a desire to purchase and pay for the item offered for sale. For example, the payment button may be selected by maneuvering a cursor over the button and pressing a mouse or a keyboard or keypad key, or virtual touch-screen key or any other medium available for selecting the button to initiate a financial transaction related to the sale of the selected item. The payment button includes a link to initiate a purchase and payment, or other information from the item listing stored in a database.

Upon selecting the payment button, the user 102 is directed to a service provider site. In one embodiment, a new window is opened for the site. In other embodiments, the site may be opened in a new tab, a smaller window overlaying the original content page, or a pop-up window on the original content page.

At step 706, the user 102 accesses the service provider site. This may include entering a password or PIN for the user's account with the service provider. If the service provider determines that payment can be approved, the user 102 is asked to confirm the payment.

At step 708, the service provider processes the payment. For example, a user account is debited and amount credited or transferred to a merchant account. The merchant account information may be contained or obtained from the payment button information initially provided by the merchant.

After payment, the user 102 is returned to the original social networking website. The user 102 may manually exit or close the payment window, or select a link in the payment window. In some embodiments, after payment is processed, the payment window may automatically close and return the user 102 to the social networking website.

Figure 8:
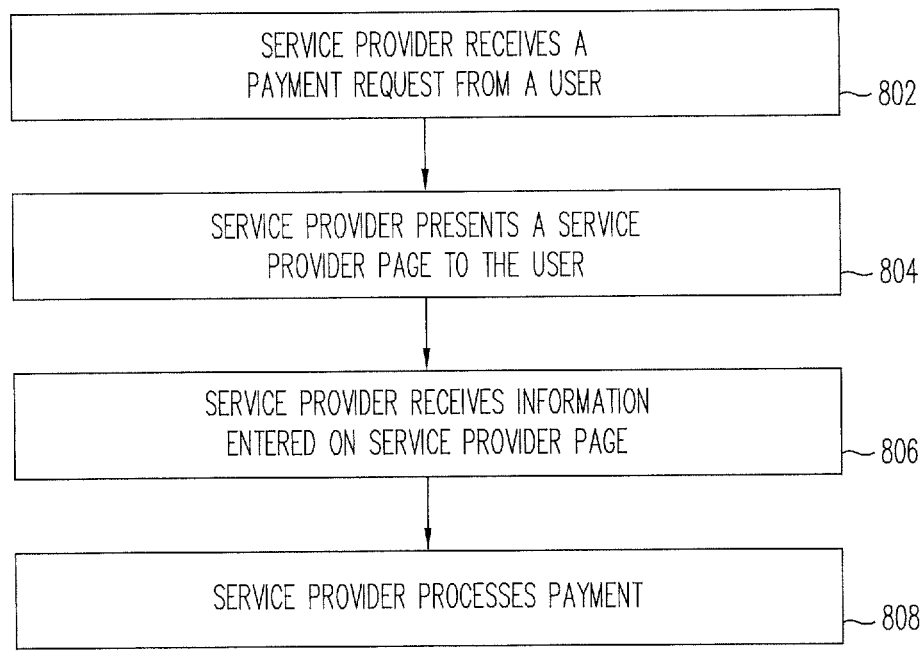
FIG. 8 is a flowchart showing a method for facilitating purchase of an item on social networking website showing the steps of a service provider according to an embodiment of the present disclosure.

Referring now to FIG. 8, a flowchart of a method 800 showing the steps performed by a service provider to process payment from a social networking website is illustrated according to an embodiment of the present disclosure. At step 802, the service provider server 180 receives a request for payment, such as when user 102 selects a payment button on a social networking website. The request may include information about the merchant who is to receive payment and the user 102. The information may be sufficient for the service provider server 180 to determine whether the user 102 and the merchant have accounts with the service provider and to access relevant account information.

At step 804, the service provider server 180 presents a service provider page to the user 102. The page can be opened from a new window or tab, where the window can be a small window overlaying a portion of the original content page. The page may include fields for the user 102 to enter information, such as a password or PIN. The user account name or identifier may already be filled in by the service provider, or the user may be asked to enter this information as well. Other types of information displayed include the amount of payment. In various embodiments, the page includes details of the payment, along with a button or link that allows the user to confirm the information and/or payment.

After the user 102 enters the requested information, at step 806, the information is received by the service provider server 180, such as when the user 102 selects a "continue" button. Once received, the service provider server 180 processes the information to determine whether the received information is acceptable. The service provider may compare the password or PIN with what is expected for the user 102. The service provider may also determine whether the indicated payment amount is within the limits set for the user 102.

At step 808, the service provider server 180 processes the payment. For example, the service provider may deduct the payment amount from the user account and transfer that amount to the merchant account. The service provider may also notify the user 102 and/or merchant that payment has been made.

Figure 9:
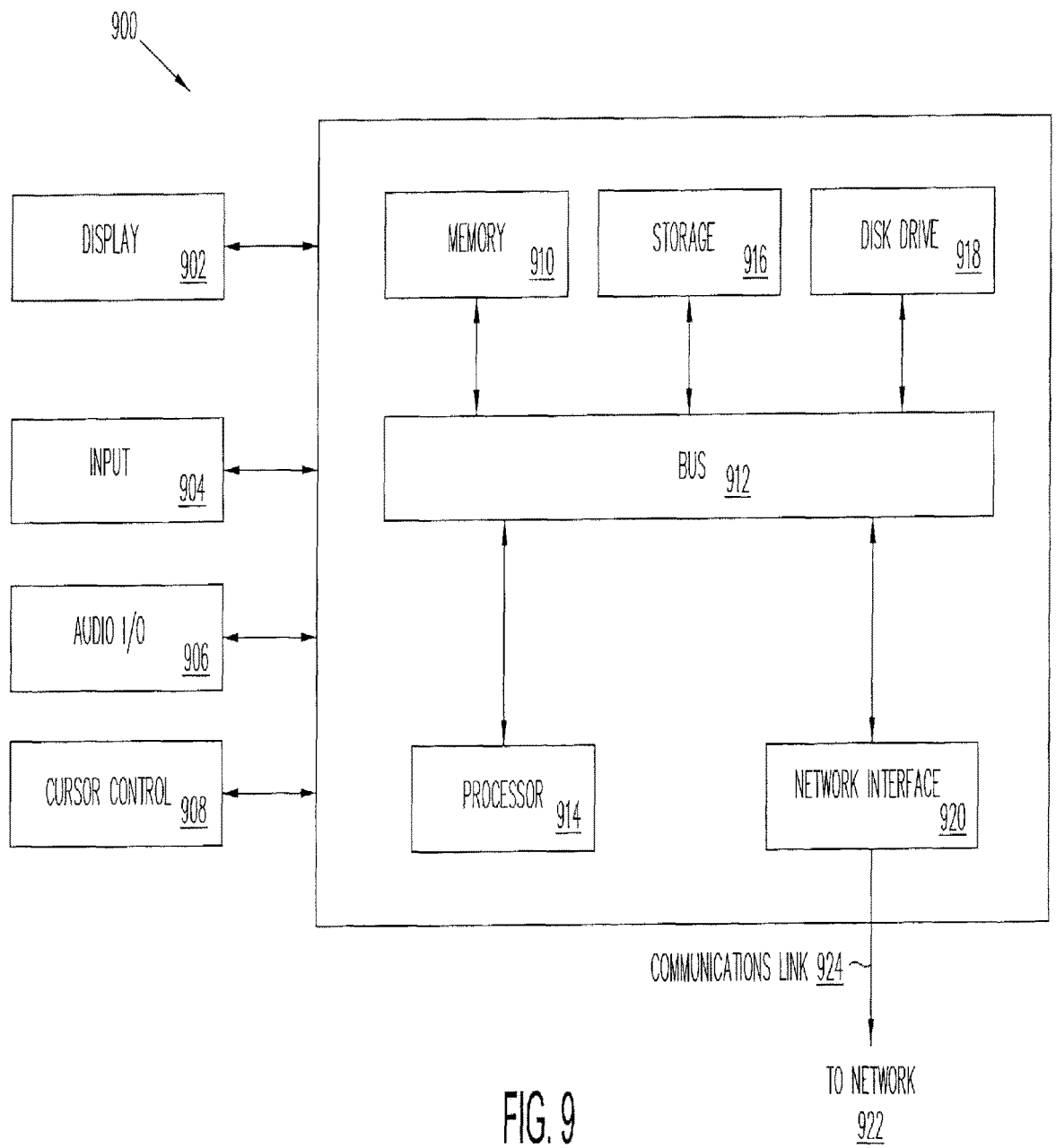
FIG. 9 is a block diagram of a system for implementing a device according to an embodiment of the present disclosure.

FIG. 9 is a block diagram of a computer system 900 suitable for implementing one or more embodiments of the present disclosure, including the user device 120, merchant server 130, and the service provider server 180. In various implementations, the user device 120 may comprise a mobile cellular phone, personal computer (PC), laptop, wearable computing device, etc. adapted for wireless communication, and the merchant server 130 and service provider server 180 may comprise a network computing device, such as a server. Thus, it should be appreciated that the devices 120, 130, and 180 may be implemented as computer system 900 in a manner as follows.

Computer system 900 includes a bus 912 or other communication mechanism for communicating information data, signals, and information between various components of computer system 900. Components include an input/output (I/O) component 904 that processes a user (i.e., sender, recipient, service provider) action, such as selecting keys from a keypad/keyboard, selecting one or more buttons or links, etc., and sends a corresponding signal to bus 912. I/O component 904 may also include an output component, such as a display 902 and a cursor control 908 (such as a keyboard, keypad, mouse, etc.). An optional audio input/output component 906 may also be included to allow a user to use voice for inputting information by converting audio signals. Audio I/O component 906 may allow the user to hear audio. A transceiver or network interface 920 transmits and receives signals between computer system 900 and other devices, such as another user device, a merchant server, or a service provider server via network 922. In one embodiment, the transmission is wireless, although other transmission mediums and methods may also be suitable. A processor 914, which can be a micro-controller, digital signal processor (DSP), or other processing component, processes these various signals, such as for display on computer system 900 or transmission to other devices via a communication link 924. Processor 914 may also control transmission of information, such as cookies or IP addresses, to other devices.

Components of computer system 900 also include a system memory component 910 (e.g., RAM), a static storage component 916 (e.g., ROM), and/or a disk drive 918. Computer system 900 performs specific operations by processor 914 and other components by executing one or more sequences of instructions contained in system memory component 910. Logic may be encoded in a computer readable medium, which may refer to any medium that participates in providing instructions to processor 914 for execution. Such a medium may take many forms, including but not limited to, non-volatile media, volatile media, and transmission media. In various implementations, non-volatile media includes optical or magnetic disks, volatile media includes dynamic memory, such as system memory component 910, and transmission media includes coaxial cables, copper wire, and fiber optics, including wires that comprise bus 912. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by computer system 900. In various other embodiments of the present disclosure, a plurality of computer systems 900 coupled by communication link 924 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The various features and steps described herein may be implemented as systems comprising one or more memories storing various information described herein and one or more processors coupled to the one or more memories and a network, wherein the one or more processors are operable to perform steps as described herein, as non-transitory machine-readable medium comprising a plurality of machine-readable instructions which, when executed by one or more processors, are adapted to cause the one or more processors to perform a method comprising steps described herein, and methods performed by one or more devices, such as a hardware processor, user device, server, and other devices described herein.

What is claimed is:

1. A method comprising:
   receiving, by an application being executed by a hardware processor of a service provider server, an activation of a first button associated with an item for sale, wherein the first button is linked to a social media service;
   generating, by the application being executed by the hardware processor, computer code to provide a second button on a website of the social media service separately from the application, wherein the second button is associated with the item for sale;
   embedding, by the application being executed by the hardware processor based on the computer code for the second button, item availability information for the item in a presentation of the second button using inventory information for the item;
   causing, by the application being executed by the hardware processor using the computer code executed with the website, the second button to be displayed on the website of the social media service, wherein the presentation of the second button on the website includes the embedded item information in a user interface displaying the website, and wherein the application causes the second button to be displayed by providing the computer code to the website;
   receiving, by the application being executed by the hardware processor, an activation of the second button on the website of the social media service via the user interface; and
   executing, by the application being executed by the hardware processor in response to receiving the activation of the second button, a process for purchasing the item for sale on the website of the social media service.

2. The method of claim 1, wherein executing the process for purchasing the item for sale causes a payment page to be displayed on the website of the social media service.

3. The method of claim 2, wherein the payment page is displayed as an overlay covering at least a part of the website of the social media service.

4. The method of claim 2, wherein the process for purchasing the item for sale is executed based on information received through the payment page.

5. The method of claim 1, wherein the generated computer code causes an embedding of a transferrable payment capability into the second button.

6. The method of claim 1, wherein the second button includes information about the item for sale, and wherein the information comprises a price and a rating of the item for sale.

7. The method of claim 6, wherein the information is propagated in the second button in real-time as the second button is displayed on the website of the social media service, the information being updated using data retrieved via an Application Programming Interface (API) end-point.

8. A system comprising:
   a non-transitory memory; and
   one or more hardware processors coupled to the non-transitory memory and configured to read instructions from the non-transitory memory to cause the system to perform operations comprising:
   receiving, by an application on the system, an activation of a first button associated with an item for sale, wherein the first button is linked to a social media service;
   generating, by the application, computer code to provide a second button on a website of the social media service separately from the application, wherein the second button is associated with the item for sale;
   embedding, by the application based on the computer code for the second button, item availability information for the item in a presentation of the second button using inventory information for the item;
   causing, by the application executing the computer code with the website, the second button to be displayed on the website of the social media service, wherein the presentation of the second button on the website includes the embedded item information in a user interface displaying the website, and wherein the application causes the second button to be displayed by providing the computer code to the website;
   receiving, by the application, an activation of the second button on the website of the social media service via the user interface; and
   executing, by the application in response to receiving the activation of the second button, a process for purchasing the item for sale on the website of the social media service.

9. The system of claim 8, wherein executing the process for purchasing the item for sale causes a payment page to be displayed on the website of the social media service.

10. The system of claim 9, wherein the payment page is displayed as an overlay covering at least a part of the website of the social media service.

11. The system of claim 9, wherein the process for purchasing the item for sale is executed based on information received through the payment page.

12. The system of claim 8, wherein the generated computer code causes an embedding of a transferrable payment capability into the second button.

13. The system of claim 8, wherein the second button includes information about the item for sale, and wherein the information comprises a price and a rating of the item for sale.

14. The system of claim 13, wherein the information is propagated in the second button in real-time as the second button is displayed on the website of the social media service, the information being updated using data retrieved via an Application Programming Interface (API) end-point.

15. A non-transitory machine-readable medium having stored thereon machine-readable instructions executable to cause a machine to perform operations comprising:
- receiving, by an application being executed by a hardware processor of a service provider server, an activation of a first button associated with an item for sale, wherein the first button is linked to a social media service;
- generating, by the application being executed by the hardware processor, computer code to provide a second button on a website of the social media service separately from the application, wherein the second button is associated with the item for sale;
- embedding, by the application being executed by the hardware processor based on the computer code for the second button, item availability information for the item in a presentation of the second button using inventory information for the item;
- causing, by the application being executed by the hardware processor using the computer code executed with the website, the second button to be displayed on the website of the social media service, wherein the presentation of the second button on the website includes the embedded item information in a user interface displaying the website, and wherein the application causes the second button to be displayed by providing the computer code to the website;
- receiving, by the application being executed by the hardware processor, an activation of the second button on the website of the social media service via the user interface; and
- executing, by the application being executed by the hardware processor in response to receiving the activation of the second button, a process for purchasing the item for sale on the website of the social media service.

16. The non-transitory machine-readable medium of claim 15, wherein executing the process for purchasing the item for sale causes a payment page to be displayed on the website of the social media service as an overlay covering at least a part of the website of the social media service.

17. The non-transitory machine-readable medium of claim 16, wherein the process for purchasing the item for sale is executed based on information received through the payment page.

18. The non-transitory machine-readable medium of claim 15, wherein the generated computer code causes an embedding of a transferrable payment capability into the second button.

19. The non-transitory machine-readable medium of claim 15, wherein the second button includes information about the item for sale, and wherein the information comprises a price and a rating of the item for sale.

20. The non-transitory machine-readable medium of claim 19, wherein the information is propagated in the second button in real-time as the second button is displayed on the website of the social media service, the information being updated using data retrieved via an Application Programming Interface (API) end-point.

* * * * *